United States Patent [19]

Prince et al.

[11] 3,997,437
[45] Dec. 14, 1976

[54] AEROBIC TYPE SEWAGE DIGESTION SYSTEM

[76] Inventors: Jack E. Prince; Franklin E. Terry, both of 2927 31st St., Port Arthur, Tex. 77640; William H. Mullins, 230 W. Kings Highway, San Antonio, Tex. 78212

[22] Filed: July 25, 1975

[21] Appl. No.: 599,133

[52] U.S. Cl. .................................. 210/4; 210/14; 210/195 S; 210/220
[51] Int. Cl.² .......................................... C02C 1/08
[58] Field of Search .................. 210/4–8, 210/14, 15, 194, 195 O, 195 M, 197, 220, 221 R

[56] References Cited

UNITED STATES PATENTS

| | | | |
|---|---|---|---|
| 2,442,241 | 5/1948 | Koruzo et al. | 210/6 |
| 3,220,706 | 11/1965 | Valdespino | 210/5 X |
| 3,271,304 | 9/1966 | Valdespino et al. | 210/14 X |
| 3,356,609 | 12/1967 | Bruemmer | 210/7 |
| 3,371,033 | 2/1968 | Simmons et al. | 210/14 X |
| 3,388,057 | 6/1968 | Callahan | 210/7 |
| 3,415,379 | 12/1968 | Thayer | 210/195 |
| 3,709,364 | 1/1973 | Savage | 210/195 M |
| 3,730,881 | 5/1973 | Armstrong | 210/6 |

*Primary Examiner*—Charles N. Hart
*Assistant Examiner*—Robert H. Spitzer
*Attorney, Agent, or Firm*—Cox, Smith, Smith, Hale & Guenther Incorporated

[57] ABSTRACT

The present invention is a system for treating sewage waste commonly called sludge. An aerator shears the solid particles while simultaneously adding oxygen to the sludge. After being pumped through the aerator, the sludge exits into a large tank. The sludge in the tank is continually circulated, drawn from the bottom of the tank and pumped through the aerator. As additional sludge is periodically added, supernatant water is removed through an overflow line of a stilling well in the center of the tank. After a lengthy period of time, part of the sludge in the bottom of the tank will be withdrawn and moved to the drying beds. With some modifications, existing anaerobic systems may be changed to the present aerobic system for a much greater capacity. Entire collection and waste treatment plant facilities may be designed utilizing the aerators at various stages.

16 Claims, 7 Drawing Figures

AEROBIC TYPE SEWAGE DIGESTION SYSTEM

BACKGROUND OF THE INVENTION

This invention relates to treatment of sewage waste commonly called sludge and, more particularly, to an aerobic system for treating the sludge. While sludge may be treated in a digester by means of anaerobic or aerobic bacteria, it has been found in the past the aerobic bacteria work much faster in the decomposition of the active ingredients commonly found in sludge. The aerobic bacteria are controlled and maintained at the optimum level with the amount of sludge being introduced to insure the system will continually operate at maximum capacity. The present invention may be designed as one portion of an overall waste treatment system commonly used by various municipalities, or the total system may be designed for utilizing the present invention.

This invention relates to U.S. patent application Ser. No. 580,521 filed June 23, 1975 which is hereby incorporated by reference.

BRIEF DESCRIPTION OF THE PRIOR ART

Prior to the present invention, various types of systems have been devised for treating sludge. Bacteria was the most common method for stabilizing sewage sludge. Some bacteria thrived best in the decomposition of sludge when free oxygen was excluded. This type of anaerobic bacteria produced a large amount of sulfides which would cause the sludge to be very septic and foul smelling. Also the sulfides contained in the sludge caused severe corrosion problems at a sewage treatment facility. An anaerobic system has the problem of gases being suspended in solid particles which would prevent the solid particles from settling out of the sludge. Grease particles become trapped further inhibiting the decomposition and treatment process.

The other type of bacteria treatment system commonly used today is generally referred to as an aerobic system. Oxygen is added to the sludge to stimulate the growth of a different type of bacteria to decompose the active material contained therein. Various types of systems have been used wherein air was bubbled up through the sludge or the sludge was pumped into the atmosphere and allowed to fall back into a tank to add additional oxygen thereto.

However the sludge is treated, the biochemical oxygen demand (hereinafter referred to as B.O.D.) of the liquid that is to be removed from the sludge must be reduced. Otherwise, the liquid separated from the sludge would not be stabilized sufficiently for reuse or disposal. Also, the solid particles contained in the liquid separated from the sludge should be reduced to as small a volume as possible. One method in common use today is the use of compressed air with various types of diffusers insuring that bubbles of air are continually released in the sludge. Aeration tanks that continually circulate the sludge to the surface of a large tank are also quite common. Many other types of systems are described in *Water Supply and Sewerage* by Ernest W. Steel published 1960 by McGraw-Hill Book Company, Inc., Chapter 25 entitled "Activated Sludge", pages 547 through 571.

Many of the prior systems use settling tanks as a principal means of removing many of the solids from the sludge. Afterwards the remaining liquid was simply disposed of by any convenient means, such as pumping into a stream. Under today's requirements with an emphasis against pollution such a treatment may no longer be possible. The number of parts per million of solids contained in the water separated from the sludge must be low, plus a very low B.O.D. To achieve the new requirements as set by various governmental agencies, new and better methods of treating sewage waste had to be developed.

SUMMARY OF THE INVENTION

It is an object of the present invention to provide an aerobic system for treating sludge.

It is a further object of the present invention to treat sludge with an aerator to promote the growth of aerobic bacteria which decompose complex organic pollutants and prevents the sludge from becoming septic and odorous.

It is yet another object of the present invention to provide a system for treating sludge which includes a tank for periodically receiving raw, secondary or waste activated sludge through an aerator, and thereafter continually recirculating the new aerobic sludge contained within the tank through the aerator with a supernatant liquor being removed through a stilling well located in the center of the tank.

It is yet another object of the present invention to modify existing anaerobic systems to aerobic systems by the installing of a stilling well in the center of an existing tank and spacing aerators around the tank so that the aerators will continually recirculate the aerobic sludge contained in the tank by discharging the sludge at an angle above and inside the tank. This will cause circular motion of the aerobic sludge in the tank. One aerator will periodically add additional raw, secondary or waste activated sludge to the tank with the supernatant overflow being drawn from the stilling well. After an extended period of time the digested sludge will be withdrawn from the tank to the drying beds.

It should be understood that an aerator in conjunction with a pump can be installed at various lift stations in the waste collection system to add oxygen to the waste products while breaking up the solid particles. The oxygen added by the aerator neutralizes the total sulphides and stops regeneration of hydrogen sulphide, therefore corrosion is reduced because sulfuric acid normally formed by the sulfurous gases is also reduced. This process of treating the sewage waste during collection can reduce the requirements placed on the sewage treatment facility at the central location.

The aerator can also be used at the headworks of a sewage treatment facility. The sewage is pumped from a tank at the final lift station, through an aerator and discharged back into the tank. This continually circulates the sewage contained in the tank through the aerator. In the sewage treatment facility, a portion of the sludge is drawn from the primary clarifiers of the sewage treatment facility. By running the sewage through the aerators and discharging into a tank, the solid particles are reduced in size and the gas particles are separated from the solid particles. Simultaneously with the escape of the gas particles grease that may be trapped in solid particles can also escape and float to the surface for normal skimming operations. By installing the aerator at the headworks of a sewage treatment facility, a more favorable environment is created for the accelerated growth of aerobic bacteria.

In conjunction with the sewage treatment facility, sludge tanks are commonly used to decompose the active ingredients of the sewage commonly called sludge. In the present system the sludge is pumped through an aerator into the tank above the sludge level. Once the tank is filled, the aerobic bacteria are allowed to grow until they reach their optimum level for decomposing the sludge. The aerator continually recirculates the sludge thereby continuously adding oxygen to the sludge and continuously shearing and breaking the solid particles contained therein. Once the aerobic bacteria has reached the desired level, additional sludge is periodically introduced into the tank through the aerator with the displaced liquid (supernatant liquid) being drawn off through a stilling well located in the center of the tank. This process is continued for an extended period of time with the aerobic bacteria being maintained at their optimum level to digest the sludge. By stopping the circulation through the aerators, the solid particles in the aerobic sludge settle to the bottom of the tank and may be drawn off as digested sludge after a short period of time. The digested sludge is sent to the drying beds for removal of the remaining liquids contained therein. By continual circulation through the aerator, the solids are broken up into microscopic size particles thereby aiding in the settling of solids, not to mention the growth rate of aerobic bacteria. All of this produces a supernatant liquid of a much better quality. The supernatant liquor may thereafter be reintroduced at the head of the plant without deleterious effect on the plant affluent.

DESCRIPTION OF THE PREFERRED EMBODIMENT

Figure 5:
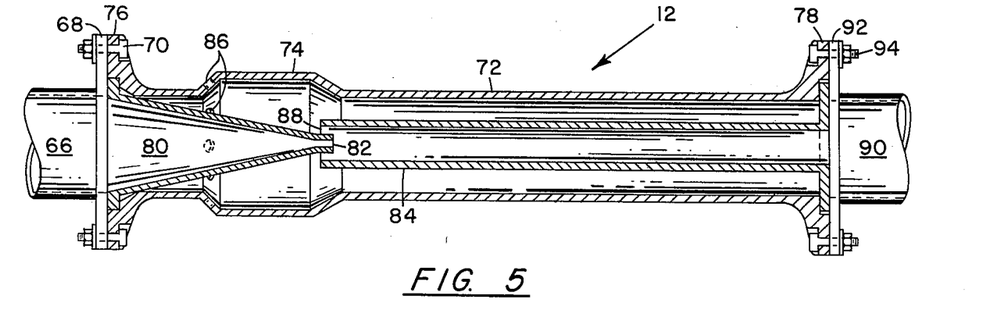
FIG. 5 is a cross-sectional view of an aerator used to condition the sludge.

In the description of the present invention, it should be realized that it embodies the use of the aerator as shown in FIG. 5 and more fully described in U.S. patent application Ser. No. 580,521 filed on June 23, 1975, previously incorporated by reference. A more complete description of the aerator will be given subsequently.

Figure 1:
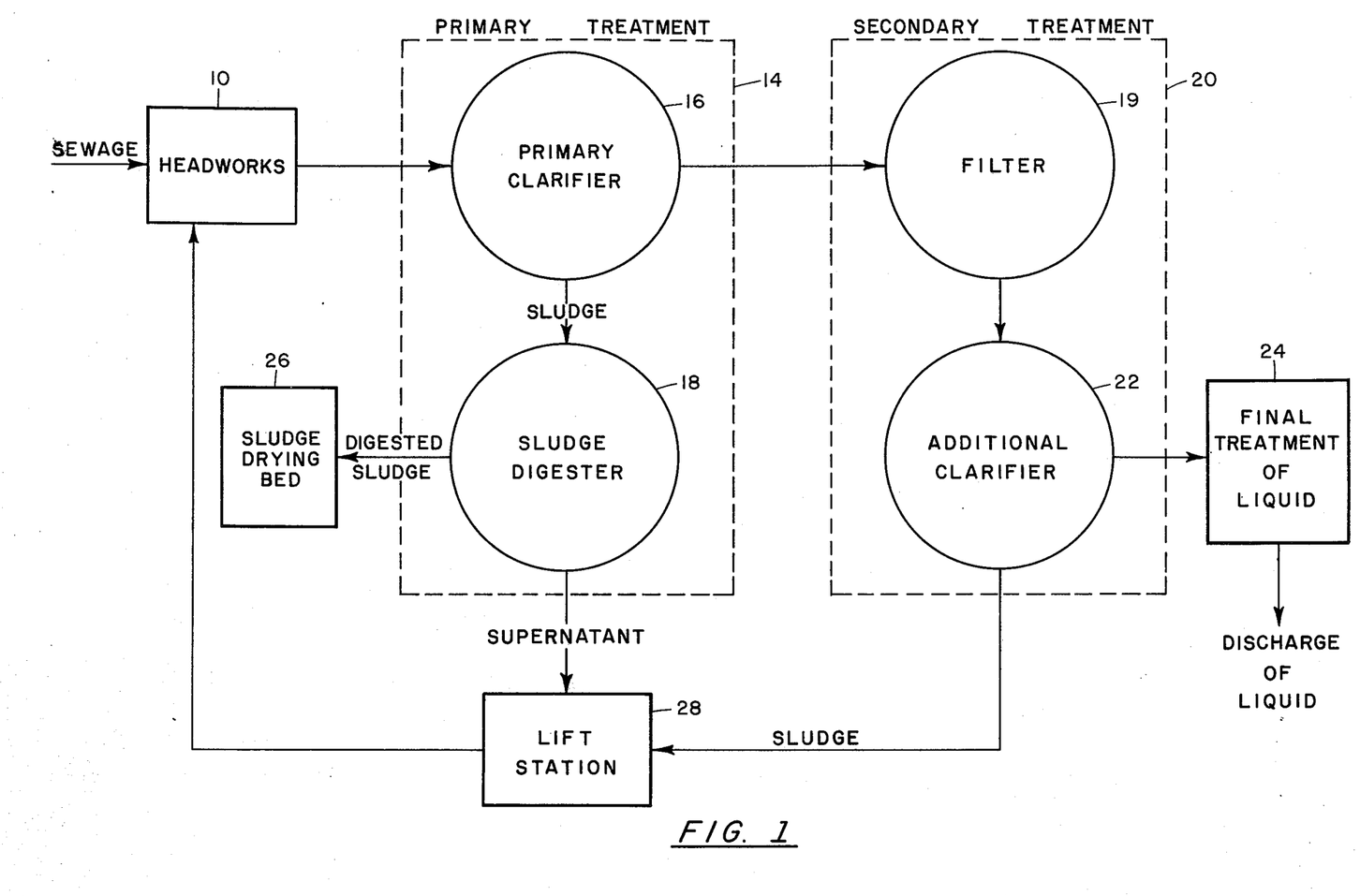
FIG. 1 is a flow representaton of sewage being treated by a waste treatment facility.

Referring now to FIG. 1 of the drawing there is shown a schematic representation of a sewage treatment facility. Raw sewage is fed into the headworks 10, normally by means of a lift station (not shown) that may include an aerator 12 as shown in FIG. 5 to precondition the sewage. In the headworks 10, large objects such as rags, stones, etc., are separated from the sewage by a screen. Also heavy particles, such as sand, sink to the bottom in the headworks and are separated from the sewage.

From the headworks the sewage goes to the first stage treatment 14 with the sewage being received by a primary clarifier 16. In the primary clarifier 16 solid particles tend to settle to the bottom to form what is commonly called sludge. From the bottom of the primary clarifier 16 the sludge is periodically withdrawn and fed to the sludge digester 18 which is still part of the first stage treatment 14. Over the top of the primary clarifier, the more liquid portion of the sewage is fed to a filter 19 of a second stage treatment 20. After running the liquid through filter 19, it will be fed into an additional clarifier 22 to again allow solid particles to settle to the bottom. Sludge is then withdrawn from the bottom of the additional clarifier 22 with the liquid overflowing the top for further treatment. Further treatment may include additional filters and clarifiers in the second stage treatment 20, in which case the additional clarifiers would still have sludge withdrawal from the bottom the same as additional clarifier 22. Upon discharge of the liquid from additional clarifier 22 (or any subsequent filters and/or clarifier stages) the liquid goes to a final treatment or liquid stage 24. This normally includes chlorination of the liquid before discharge of the liquid to a convenient outlet such as a body of water, reuse, or irrigation.

Referring back to the sludge digester 18, the sludge from the primary clarifier 16 is fed into the sludge digester 18 through an aerator 12 in a manner that will be subsequently described. The sludge digester 18 is continually circulated with a supernatant being removed from a center stilling well. The digested sludge is periodically removed from the sludge digester 18 to sludge drying beds 26. The supernatant from the sludge digester 18 is fed into a lift station 28 which also receives sludge from additional clarifier 22 and any other clarifiers that may be included in the second stage treatment 20. The lift station 28, which includes an aerator 12, raises the supernatant and sludge to a level so that it may flow by gravity into the headworks 10 for recirculation.

It should be understood that every waste treatment facility is different; however, every waste treatment facility known to applicant contains three basic elements, namely, a headworks, primary treatment and secondary treatment. The headworks 10 screens and filters the sewage being received to remove heavy objects therefrom before treatment of the sewage. A first stage treatment normally consists of a settling tank commonly called a primary clarifier to remove the solid objects from the liquid waste. What is done with the solid objects from the primary clarifier varies according to the waste treatment facility. With recent emphasis on ecology and environment, more and more municipalities are being required to treat the sludge withdrawn from the primary clarifier prior to disposal. Some municipalities have gone to the extent of decomposing the sludge and selling it as fertilizer. The present invention includes the treatment of the sludge in the sludge digester 18 for a better and more complete decomposition of the sludge.

All sewage treatments known to applicant also have a second stage treatment wherein the overflow of the primary clarifier is fed through various filters and additional clarifiers to separate the solid particles contained in the sewage from the liquid and to reduce the B.O.D. This may consist of a single stage or numerous stages depending upon the particular plant design; however, any of the additional clarifiers will also produce sludge that must be treated and/or disposed of by the facility. Normally the liquid from the secondary treatment is simply treated, usually by chlorination, and released into a body of water. Considerable emphasis is being placed today on reuse of the liquid. The biggest problem faced by most sewage treatment facilities is what to do with the sludge. Some rather large municipalities are currently discharging sludge into the ocean or streams of water. Even sludge that is digested in the sludge digester 18, or any other suitable decomposition facility of the sewage treatment plant, there is still a problem of what to do with the sludge. After the sludge is decomposed as much as practical, it is normally fed to a sludge drying bed wherein the solid particles are simply allowed to settle out of the liquid. Still the sludge must be cleared out of the drying beds and hauled away.

Figure 2:
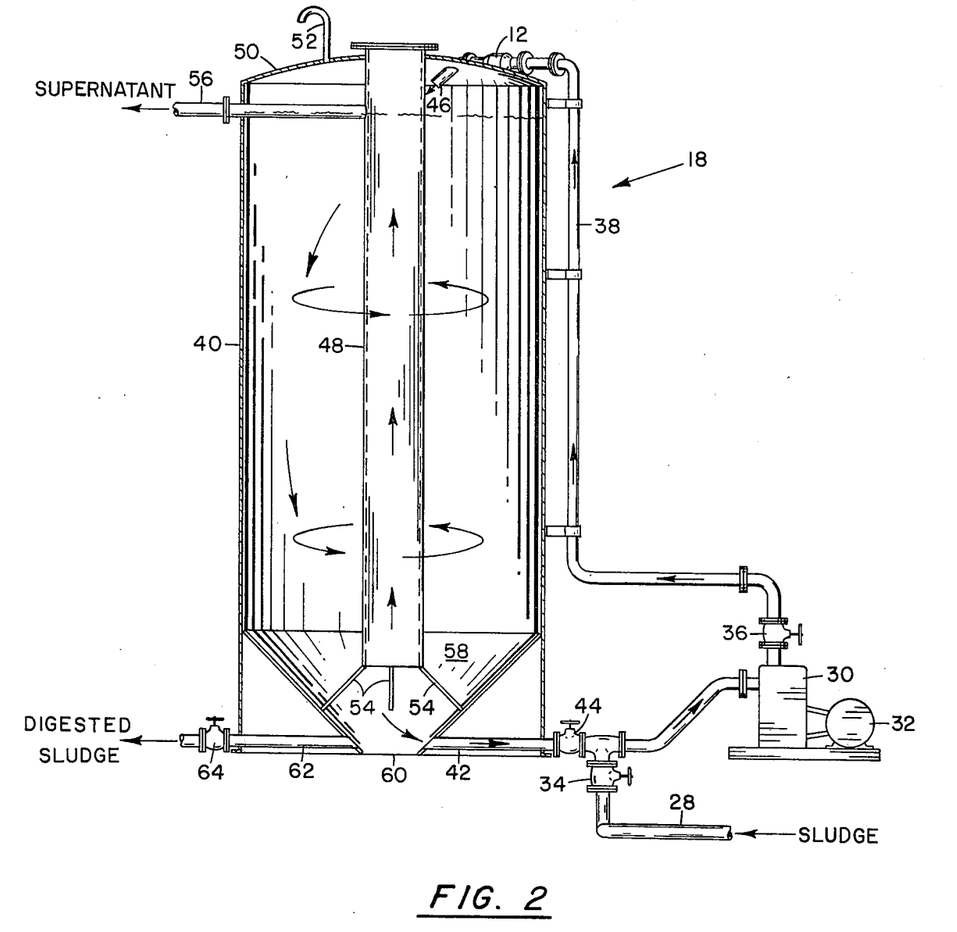
FIG. 2 is an elevated cross-sectional view of a sludge digester using an aerator.
Figure 3:
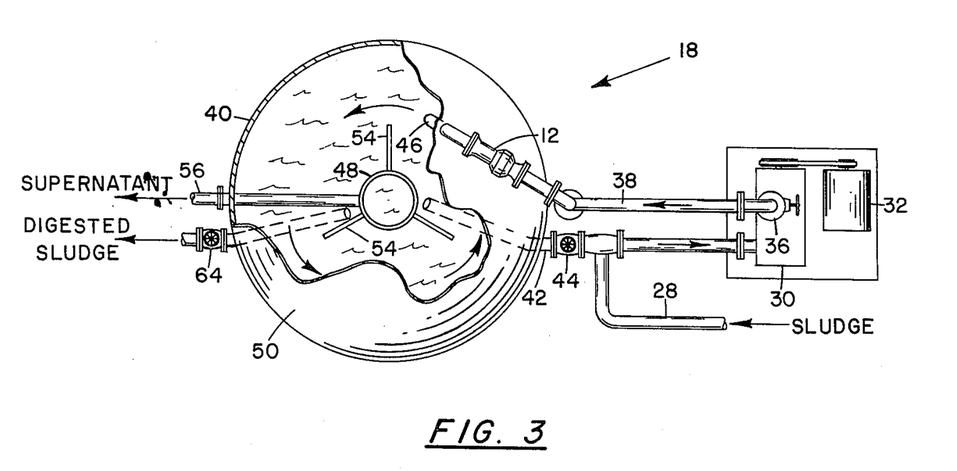
FIG. 3 is a top view of FIG. 2 with a portion of the top being cut away for clarity.

Referring now to FIGS. 2 and 3 of the drawings there is shown a very simple sludge digester 18. Sludge is received by the sludge digester 18 through pipe 28. During normal operation of the sludge digester 18, a pump 30 is continually operated by motor 32 which initially draws the sludge in through pipe 28, valve 34 for discharge through outlet valve 36, pipe 38, aerator 12 into tank 40. After the tank 40 is filled to the level indicated in the drawing of FIG. 2, valve 34 is shut off and the sludge is continually circulated by drawing sludge out of the bottom of tank 40, through sludge recirculation pipe 42, recirculation valve 44 into pump 30. Due to the angle of discharge of the aerator 12 by discharge pipe 46, off-center of the tank 40 and downward at an angle of approximately 45° from the horizontal position, a rather strong circulating turbulence is created inside the tank 40. Not only is the turbulence circular in motion as indicated by the arrows, but it is also from the bottom to the top of the tank 40.

In the center of tank 40 is located a stilling well 48 which is attached to the top 50 by any conventional means such as welding. The top 50 includes air vent 52 to prevent a pressure build-up in tank 40. The lower portion of the stilling well 48 is mounted on legs 54 in the manner shown in the drawing. The stilling well 48 is cylindrical shaped with a supernatant line 56 being connected thereto and feeding through the side of tank 40. Even while the turbulence inside of tank 40 is rather severe due to the recirculation of the pump 30 and the discharge by aerator 12, the liquid contained inside of stilling well 48 is very calm. This allows any solid particles inside of stilling well 48 to fall to the bottom of tank 40.

In the present sludge digester 18 the aerator continually adds oxygen to the sludge being circulated inside of tank 40 which thereby promotes the growth of oxygen dependent microorganisms. In the present invention, rotifers are used to decompose the aerobic sludge. A rotifer is the simplest of multicelled animals. A rotifer may move fairly swiftly through the sludge from one point to another. Upon reaching solid matter not decomposed, the rotifer attaches itself to the solid matter and begins to feed at that spot. The rotifer pulls in tremendous quantities of liquid in search for food which further aids in the decomposition of the sludge contained in tank 40. Since a rotifer is an oxygen dependent microorganism, its growth rate is best when the maximum amount of oxygen is dissolved in the sludge.

Figure 4:
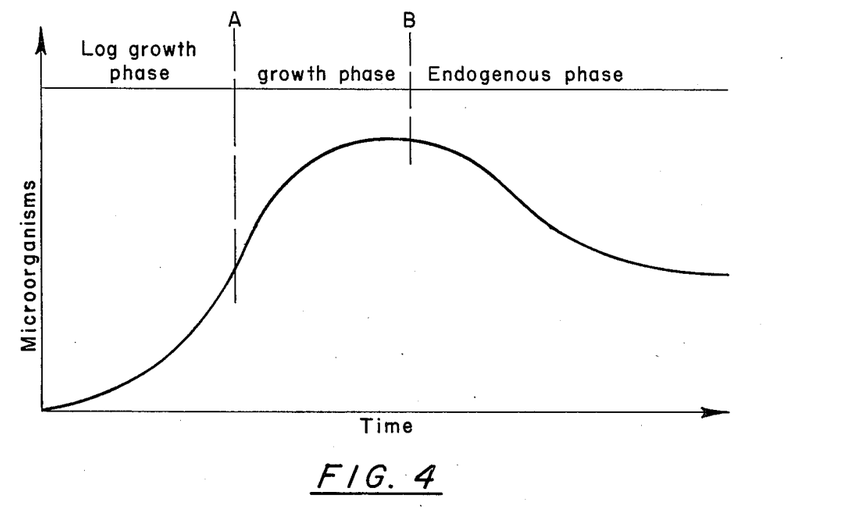
FIG. 4 is a growth rate diagram of microorganisms contained in the sludge digester.

Referring now to FIG. 4, there is shown a typical growth rate for microorganisms in sludge as compared to time. While the graph shown in FIG. 4 is for a constant feed system where sludge is continually or periodically being added to the system, the first portion of the growth cycle is approximately the same whether or not it is a constant feed system or an isolated sludge digester without additional sludge being added thereto. Initially the number of microorganisms, including rotifers, inside of the sludge digester 18 will increase along a logarithmic growth rate until it reaches point A in time as shown in FIG. 4. Thereafter the growth rate will be a declining growth rate until it reaches point B which is the maximum number of rotifers and/or microorganisms contained inside of sludge digester 18. Thereafter, the microorganisms enter the endogenous phase which is different from a fixed system that does not add additional sludge. In the present system the sludge digester is being operated on the reverse side of the curve represented by the endogenous phase which is maintained by a periodic or constant feed of sludge to the sludge digester 18. It is desirable to operate as close to point B on the reverse side of the scope as possible thereby maintaining the maximum amount of decomposition by the rotifers inside of sludge digester 18 while also decomposing the sludge as much as possible before withdrawal from the sludge digester 18.

Referring back to FIGS. 2 and 3 after the growth rate of the rotifers inside of sludge digester 18 has reached the endogenous phase, additional sludge is added to the sludge digester 18 by opening valve 34. As additional sludge is added through valve 34, the level of the liquid inside of tank 40 will rise thereby causing the supernatant to overflow through supernatant line 56. The supernatant flowing out of supernatant line 56 is relatively clear because of the settling action that takes place inside of stilling well 48. Once the endogenous phase has been reached inside of sludge digester 18, normally valve 34 will be automatically opened for fixed periods of time to add additional amounts of sludge into the sludge digester 18. The sludge will automatically be drawn through pump 30 along with the recirculating sludge flowing through sludge recirculating pipe 42 so that all sludge is treated by aerator 12 prior to discharge inside of tank 40.

After a period of time the buildup of solid particles inside of tank 40 will have to be removed for proper operation of the sludge digester 18. In a typical system a sludge digester 18 can operate approximately 1 month prior to the withdrawal of digested sludge from the system. To withdraw digested sludge pump 30 is turned off so that recirculation is no longer taking place inside of tank 40. After a period of time all the solid particles will settle to the bottom and, due to the cone shaped surface 58, will tend to slide towards the bottom 60 of tank 40. Normally the settling will require approximately 2 hours before digested sludge can be withdrawn from tank 40 by means of digested sludge line 62 by opening valve 64. The digested sludge flowing from digested sludge line 62 is fed to the sludge drying beds 26 as previously described in conjunction with FIG. 1. Care should be taken not to withdraw too much digested sludge from the tank 40 thereby unduly disturbing the microorganism balance necessary for the maximum decomposition of the active components of the sludge. After valve 64 is closed, the pump 30 is again turned on and additional sludge added to the system to refill the tank 40 to the supernatant line 56.

The temperature of the sludge inside of the sludge digester 18 is one of the essential elements controlling the growth of microorganisms, namely rotifers, inside of the sludge. It has been found that as the temperature approaches 35° centigrade, the growth rate of one type of bacteria (commonly called mesophyllic) in the sludge is at its maximum. With any further increase in temperature the mesophyllic bacteria will begin to die very rapidly. However, for increased temperature another type of bacteria (commonly called thermophyllic) will begin to grow and digest the sludge. Referring to FIG. 4, the log growth phase of the diagram is when there is an excess of food around the microorganisms namely aerobic sludge. The rate of metabolism and growth by the microorganisms is only limited by its ability to process the organic matter contained in the sludge. In aerobic systems the maximum rate of stabilization between the microorganisms and the organic matter being supplied through the sludge determines the maximum rate of oxygen required. Prior to the present invention, the low rate of oxygen transfer by diffused-air equipment limited the rate of growth in the log phase and thwarted the use of log growth in waste stabilization. It should be realized that during the log growth phase the organic matter contained in the sludge did not completely decompose because there is an excess of food available for all the microorganisms. During the declining growth phase there is not an unlimited amount of food available for the microorganisms which causes a decrease in the growth of the microorganisms. The declining growth phase is quite often used for waste stabilization by sanitary engineers. Even in this phase, however, there is still a large amount of active sludge in the sludge digester 18.

when the growth rate of the microorganisms cease and food concentration is reduced to a minimum, the endogenous phase has been reached. The small quantity of organic matter still in solution is in equilibrium with the microorganisms. As the microorganisms demand more food, they are forced to metabolize their own protoplasm, as well as slowly decrease the food concentration in the sludge. The mass of the microorganisms and the food concentration in the sludge ratio remains constant during the endogenous phase. By periodically feeding additional sludge through the aerator 12 into the tank 40, a continuing supply of sludge is being added to tank 40 for feeding the microorganisms. At the same time the sludge contained in sludge digester 18 has the lowest concentration of active ingredients practical and still maintain an optimum rate of decomposition of active ingredients. Therefore, when digested sludge is drawn out through the digested sludge line 62 and valve 64 for transfer to the sludge drying beds 26, the active components have been decreased to a minimum.

As the rotifers or other microorganisms feed on the active ingredients of the sludge for decomposition of the organic matter, they give off heat which will normally maintain the temperature of the sludge inside of the sludge digester 18 at or near 35° centigrade; however, if the tank 40 does not have fairly good insulation such as concrete side walls, in some of the colder environments it may be necessary to heat the sludge by including a heat exchanger in line with the pump 30. This is only necessary if the environment in which the sludge digester 18 is being used may decrease the temperature below the optimum level. Any other type of conventional heating system for maintaining the temperature of the sludge near its optimum level for microorganism growth may also be used.

It has been found that the metabolism of aerobic microorganisms give off many times the energy as the metabolism of anaerobic organisms in the same substance. This means that the rate of growth of microorganisms per a given mass of organic matter will be many times greater under aerobic conditions than under anaerobic conditions. This in turn means that a much greater amount of the organic matter may be decomposed in a given volume aerobic system than in an identical volume anaerobic system. Because many of the present sewage treatment facilities use anaerobic sludge digesters, the capacity of the sludge digesters can be greatly increased by converting to an aerobic system using the aerator 12.

Before describing a typical conversion from an anaerobic to an aerobic system a better understanding of the aerator 12 is necessary. Referring to FIG. 5, sludge is fed into the aerator 12 through an inlet pipe 66 which is attached to the aerator 12 by means of a flange 68 and bolts 70. The aerator 12, which includes a cylindrical housing 72 having an enlarged portion 74, has on each end of the housing 72 a flange 76 and 78 with flange 76 being attached to flange 68 of the inlet pipe 66 by means of the bolts 70.

Securely held in position between flange 76 and 68 is a cone 80 having a discharge nozzle 82. The discharge nozzle 82 discharges sludge received through inlet pipe 66 into a uniform cross-section mixing chamber 84 which surrounds discharge nozzle 82. It should be understood that the cross-sectional area of the mixing chamber 84, while larger than the nozzle 82, is still considerably smaller than the cross-sectional area of the inlet pipe 66. Surrounding the leading edge of the enlarged portion 74 are located a series of apertures 86. As the sludge is pumped through inlet pipe 66, cone 80 and nozzle 82, the pressure as exerted on the sludge is suddenly reduced upon discharge to the mixing chamber 84 which creates a venturi effect to cause a vacuum to draw atmosphere into mixing chamber 84 through apertures 86 and opening 88. Inside of mixing chamber 84 the atmosphere and sludge is intimately mixed by a very turbulent action therein. Afterwards both the sludge and intimately mixed atmosphere is suddenly discharged into an enlarged area. In the present drawing as shown in FIG. 5, the enlarged area is represented by a discharge pipe 90 that is attached to flange 78 by means of flange 92 and bolts 94. While the present invention shows a rather large discharge pipe 90, it should be understood that sludge may be discharged into a tank, sewerage line or any other means of discharge at or near ambient pressure. All that is required is that the large discharge pipe 90 be filled so that a vacuum will be created to draw oxygen in through the apertures 86. As the sludge is pumped through nozzle 82, the pressure is suddenly reduced which causes a shearing and explosive effect for entrained gases trapped in the solids resulting in a shearing or exploding of the solid particles. This occurs again as the oxygen and sludge are discharged from mixing chamber 84 into the enlarged cross-sectional area defined by discharge pipe 90. This shearing or explosive effect caused by rapid changes in pressure and cross-sectional area, in combination with very turbulent action, breaks up the solid particles thereby releasing grease that is trapped therein and releasing the entrapped gas particles such as sulfurous gases. By releasing the sulfurous gases, the sludge or sewage being treated will lose much of its foul odor and will not form the sulfuric acid that causes tremendous corrosion problems in waste treatment facilities. In fact, aerobic bacteria and microorganisms will begin to grow even in a sewage collection system that uses aerators 12 at the lift stations. In a complete system using the aerators 12, they should be installed at selected lift stations that raise the sewage, immediately prior to the headworks 10 and in the lift station 28 returning the supernatant and sludge from the additional clarifiers 22 to the headworks 10. By repeated circulation through the aerator 12 as was previously described with the sludge digester 18, the solid particles inside the sludge will continually be broken down to the smallest possible size to release grease or entrapped gaseous particles while simultaneously combining with the maximum amount of oxygen for more rapid digestion by the microorganisms.

Figure 6:
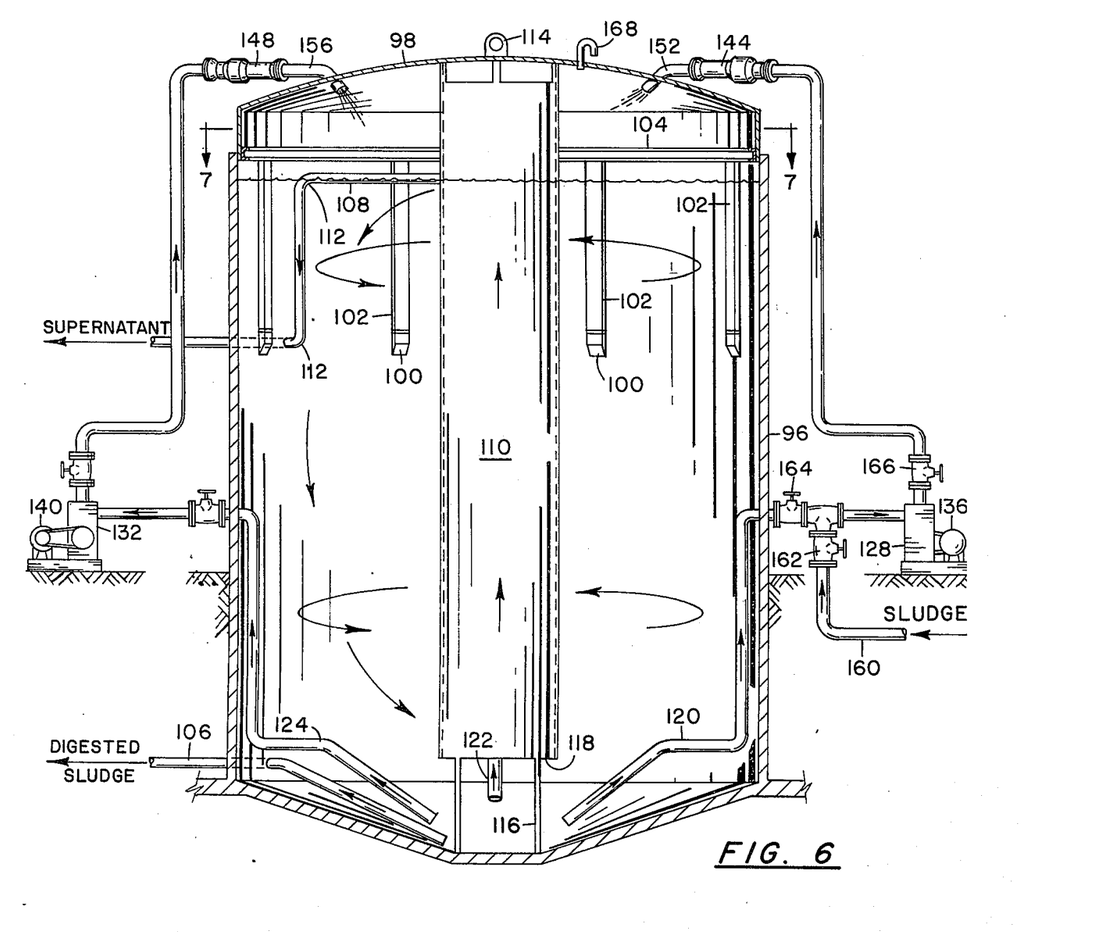
FIG. 6 is an elevated cross-sectional view of an anaerobic sludge digester after conversion to an aerobic sludge digester, the section being taken along section lines 6—6 of FIG. 7.
Figure 7:
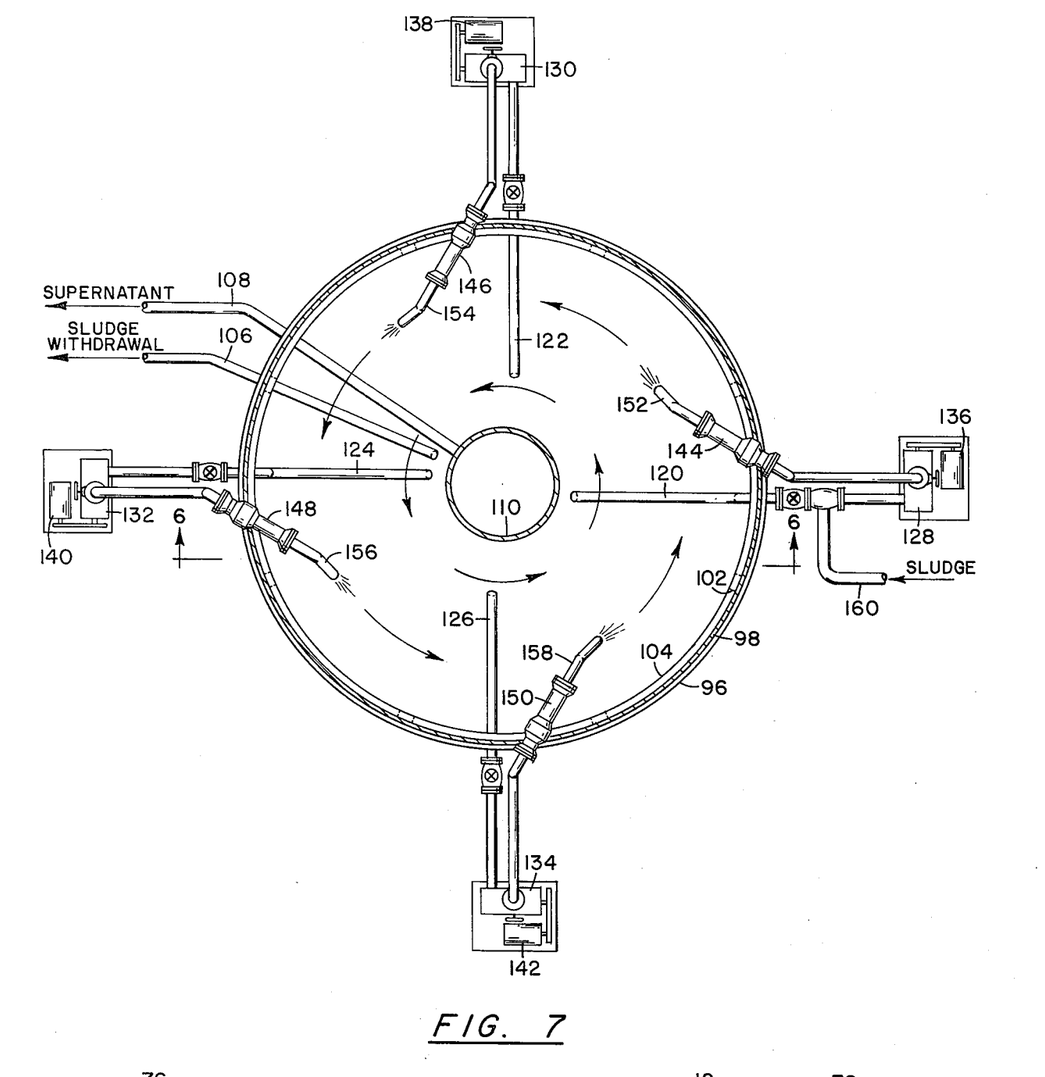
FIG. 7 is a top view of FIG. 6 with the top of the tank being cut away along section lines 7—7.

Referring now to FIGS. 6 and 7 in combination, there is shown a typical anaerobic sludge digester after conversion to an aerobic digester. In a typical anaerobic system the tank 96 is normally larger than the tank for an aerobic system. Probably half of the anaerobic sludge digesters have a floating top that floats up and down inside of tank 96. The present modification of the anaerobic system secures the top 98 in its uppermost position. Since the top 98 in an anaerobic system commonly has stops 100 to prevent the top 98 from going below a given position, the present modification to locate the stop in its uppermost position simply includes the installing of support beams 102 between the stops 100 and flange 104 of top 98. In the typical modification of an anaerobic to an aerobic system, the top 98 is simply removed by a crane and the internal portion of tank 96 is cleaned of any residue from the prior system. Any type of paddles or other circulation devices contained inside of tank 96 are removed. The former sludge withdrawal line 106 which withdraws digested sludge is still used for the same purpose. Also the supernatant withdrawal line is also used for the same purpose; however, it is now connected to a stilling well 110 which is installed in the center of the tank 96. The supernatant withdrawal line 108 may also include a couple of elbows 112 so that the supernatant withdrawal line can conduct into the stilling well 110 at the maximum elevation possible thereby increasing the total capacity of the sludge digester tank 96. The stilling well 110 is attached to top 98 prior to the lifting of the top 98 back into position by a crane connected to I-bolt 114. On the other end the stilling well 110 is supported by legs 116 that are connected to stilling well 110 around opening 118. Also before top 98 is reinstalled into position, sludge recirculation lines 120, 108, 124 and 126 are installed in tank 96. Each of the sludge recirculation lines 120, 122, 124 and 126 feed through a pump 128, 130, 132 and 134, respectively. Each of the pumps 128, 130, 132 and 134 are driven by motors 136, 138, 140 and 142, respectively, for recirculating sludge through each respective aerator 144, 146, 148 and 150. The output from each of the aerators 144, 146, 148 and 150 is discharged downward and at a forty-five degree angle through elbows 152, 154, 156 and 158, respectively, to cause circulation inside of tank 96 in one direction around stilling well 110. By referring to FIG. 6 the direction of circulation of the sludge inside of tank 96 is illustrated by the arrows. It should be realized that circulation occurs not only in a circular motion, but also from top to bottom of the tank 96 also as illustrated by the arrows in FIG. 6. Additional sludge to be added to the tank 96 flows through sludge line 160 and valve 162 in a manner previously described in conjunction with FIG. 2. After the endogenous phase has been obtained inside of tank 96 by continual recirculation of the sludge through the aerators 144, 146, 148 and 150, valve 162 will be periodically opened to add additional sludge to the tank 96 for continual digestion by the microorganisms. Overflow from the tank 96 is removed as supernatant from the supernatant line 108 connected to the stilling well 110. Valves 164 and 166 are normally open for continual recirculation of the sludge inside of tank 96; however, one and/or both may be closed on such occasions as the filling of tank 96 or withdrawal of digested sludge through sludge withdrawal line 106. Also before reinstalling 98 and the various aerators, vent line 168 should be installed to prevent pressure buildup inside of tank 96. By the conversion of an anaerobic system as shown and described in conjunction with FIGS. 6 and 7 applicant has reduced the required number of gallons per capita in the sludge digester by a factor as high as nine.

Factors that are extremely important in the treatment of sludge is the biochemical oxygen demand (heretofore called B.O.D.) and the parts per million count of solids. Naturally, the digested sludge should have as low B.O.D. as possible, yet as high a parts per million solid count as possible. Likewise, the supernatant should have as low a B.O.D. count as possible, but should have a small parts per million solid count as possible. By the use of the present system applicants have found that they can greatly increase their parts per million solid count for the digested sludge, while significantly reducing the B.O.D. Because of the settling effect in the stilling well 110, the supernatant has a relatively low parts per million solid count. However, contrary to prior systems the supernatant is not disposed of from the sludge digester, but is simply recirculated back to the headworks of the waste treatment facility. The digested sludge as treated by a sludge digester 18 with the aerators 12 will form almost a slurry solution for discharge to the drying beds. This digested sludge very rapidly settles to the bottom allowing rapid separation from the liquid contrary to prior digested sludge for earlier aerobic and anaerobic systems. This allows a much more rapid rotation of use for the various drying beds which also increases the capacity of the waste treatment facility.

It is very important that just the right amount of sludge be periodically added to the sludge digester 18 to maintain a balance between the microorganisms that decompose the active ingredients of the sludge and the amount of food being added for decomposition. It is desirable that the digested sludge being withdrawn from the sludge digester have as much decomposition as practical before discharge to the drying beds.

We claim:
1. In a waste treatment facility for decomposing waste substance comprising:
   headworks for receiving sewage containing waste substance, said headworks having screening means;
   flow means for said waste treatment facility to allow said sewage to flow therethrough;
   a primary stage for receiving sewage from said headworks including a primary clarifier, said primary clarifier receiving sewage from said headworks via said flow means, said primary clarifier allowing sludge which includes concentrated waste substance to settle to the bottom and be withdrawn to a sludge digester via said flow means;

a secondary stage for receiving overflow from said primary clarifier including filter means receiving said overflow via said flow means and additional clarifier means for further treatment of sewage received from said filter means via said flow means before discharge of liquids separated therefrom;

said sludge digester including pump means for continually circulating sludge in said sludge digester through first conduit means, an aerator that immediately discharges above the level of said sludge into said sludge digester, means for controllably adding sludge to said sludge digester through said aerator, a supernatant overflow being discharged from the sludge digester through a stilling well located in said sludge digester and an appropriate overflow conduit connected thereto, said sludge digester having means for periodically withdrawing digester sludge from said sludge digester after a short settling time.

2. The waste treatment facility as recited in claim 1 wherein said aerator includes a nozzle for drawing air through apertures into a mixing chamber before discharge, said aerator shearing solid particles, releasing entrapped gases and grease and intimately mixing sludge with air.

3. The waste treatment facility as recited in claim 2 further including a first lift station for receiving said supernatant from said overflow conduit of said sludge digester and sludge from said additional clarifier means via said flow means, said lift station including a pump and aerator for conditioning said supernatant and sludge by flowing therethrough via a second conduit means before transmission to said headworks via said flow means.

4. The waste treatment facility as recited in claim 3 further including a second lift station for raising said sewage to said headworks via said flow means, said second lift station having a pump and aerator for preconditioning said sewage by flowing said sewage therethrough via third conduit means before receipt by said headworks.

5. The waste treatment facility as recited in claim 4 further including pumps and aerators in a sewage collection system with flow connection to said headworks, said pump circulating said sewage through said aerators via fourth conduit means at various collection lift stations throughout said sewage collection system.

6. The waste treatment facility as recited in claim 5 includes sludge drying beds with first means for receiving said digested sludge and separating water from the waste substance, said waste treatment facility having a final treatment stage with second means for receiving said liquid to be discharged, said final treatment stage including chlorination means prior to discharge.

7. A sludge digester for use in a waste treatment facility comprising:
a tank for holding sludge;
pump means having flow means for circulating sludge in said tank through an aerator, sludge being withdrawn by said pump means near the bottom of said tank and discharged by said aerator above the sludge level in said tank, said aerator including a nozzle means through which said sludge is first ejected into a reduced diameter mixing chamber and air is drawn into said aerator through aperture means between said nozzle means and said mixing chamber;
a stilling well in said tank having a lower entrance thereto and a upper exit therefrom, said upper exit being for a supernatant liquid discharged from said tank;
first valve means connecting said pump means to a source of sludge via said flow means, said first valve means being adapted to controllably add sludge to said tank;
second valve means being adapted to periodically withdraw digested sludge through a conduit from the bottom of said tank after a short settling period;
said sludge being controllably added by said first valve means at such a rate that aerobic microorganisms may decompose most organic matter in said sludge in said tank prior to withdrawal.

8. The sludge treatment system as recited in claim 7 wherein said stilling well is a cylinder located at approximately the center of said tank, the bottom of said cylinder being open to form said lower entrance a short distance above the bottom of said tank.

9. The sludge treatment system as recited in claim 8 wherein said tank is approximately cylindrical, said aerator discharging into said tank at a downward angle and to one side to cause sludge to circulate throughout said tank except in said stilling well where solid particles may settle out.

10. The sludge treatment system as recited in claim 9 wherein the bottom of said tank is generally cone shaped so that digested sludge may settle near an opening of said conduit for withdrawing said digested sludge.

11. The sludge treatment system as recited in claim 7 wherein said aerator includes a cone for discharging sludge through a nozzle into a mixing chamber, discharge of sludge through said nozzle drawing air through an opening into said mixing chamber for intimate mixing with said sludge before discharge therefrom into an enlarged cross-sectional area, rapid changes in cross-sectional areas in said aerator shearing solids and releasing entrapped gas and grease.

12. A method of treating sludge comprising the steps of:
pumping sludge through a first conduit to an aerator;
first discharging of sludge through a nozzle of said aerator into a mixing chamber to shear solids and release entrapped gas and greases;
drawing air into said mixing chamber through apertures in said aerator for an intimate mixing with said sludge;
second discharging of sludge from said mixing chamber into tank means at ambient pressure for retaining said sludge, said second discharging being above said sludge in said tank;
recirculating sludge from said tank means through the prior steps by withdrawing sludge from near the bottom of said tank means;
controllably adding sludge to said tank means by pumping through said aerator; and
removing overflow of said tank means by a second conduit connected to a stilling well in said tank means.

13. The method of treating sludge as recited in claim 12 further including the steps of periodically allowing sludge to settle in said tank means and opening a first valve means to remove some sludge from said tank means via a third conduit.

14. The method of treating sludge as recited in claim 13 wherein said controllably adding step includes opening a second valve means at given intervals so that a pump will draw additional sludge into said pump during said pumping step.

15. The method of treating sludge as recited in claim 14 wherein said second discharging step includes directing said sludge off-center of said tank means and at an angle to circulate sludge in said tank means.

16. The method of treating sludge as recited in claim 13 wherein said step of controllably adding sludge keeps equilibrium between microorganisms in said sludge and sludge available for decomposition by said microorganisms.

* * * * *